Jan. 7, 1930.                C. C. HANSEN                 1,742,765
                       GUIDE FOR BROACHING TOOLS
                          Filed Oct. 4, 1927
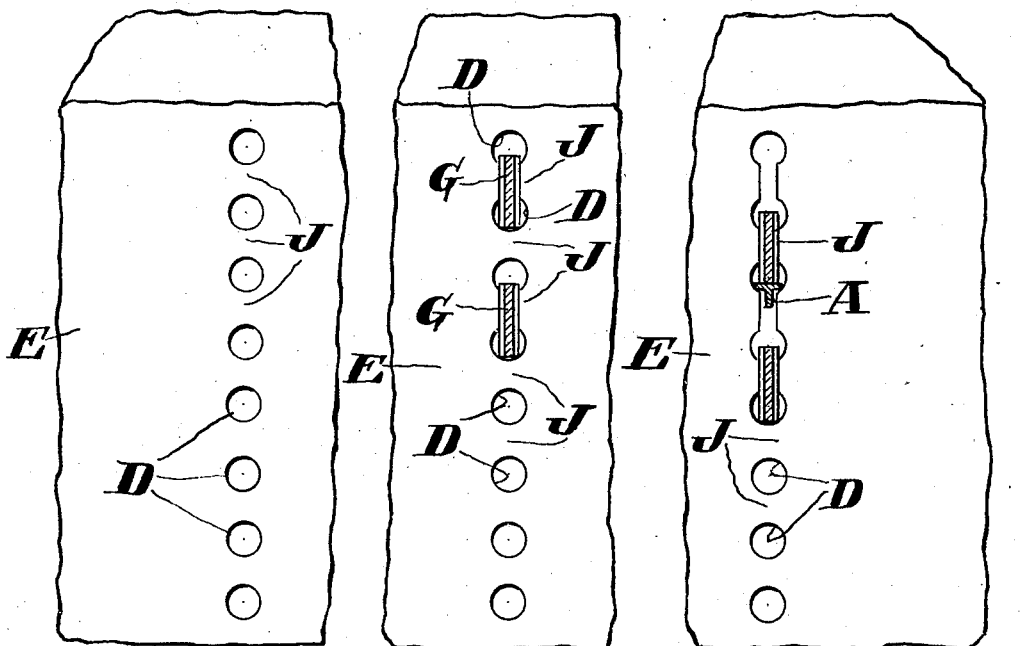
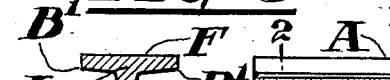
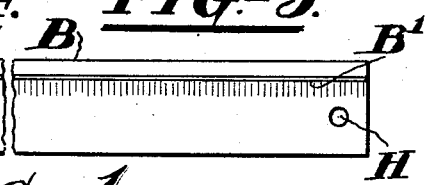
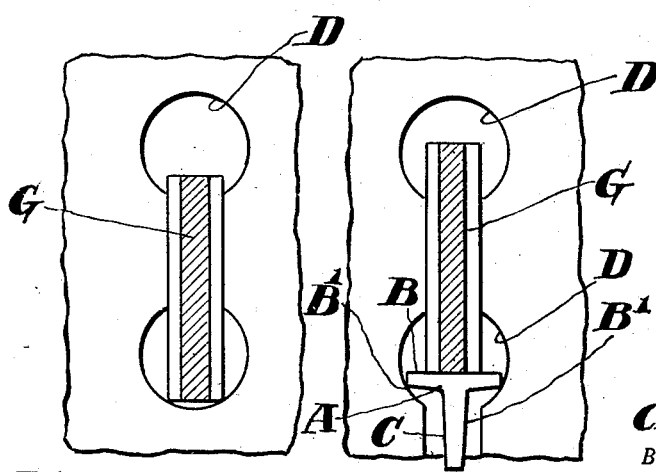
INVENTOR.
Charles C. Hansen
BY Herbert G. Ogden
HIS ATTORNEY Patented Jan. 7, 1930

1,742,765

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

GUIDE FOR BROACHING TOOLS

Application filed October 4, 1927. Serial No. 223,935.

This invention relates to guides for rock cutting implements, but more particularly to a guide for broaching tools used in fluid actuated rock drills for cutting away the rock between adjacent drill holes.

The present invention is more particularly intended for use with drilling apparatus in which two broaching tools are actuated by rock drills mounted side by side on the same mounting and in which the broaching tools lie in a horizontal position for making cuts in a vertical rock face. The usual method of removing rock by means of broaching tools is to drill a series of holes in line with the holes so spaced as to leave a wall of material between adjacent holes of a width which may be readily spanned by the cutting bit of the broaching tool.

Ordinarily, where only one broaching tool is being used, the lowermost portion of the wall of the lower hole may always act as a guide for the tool. Where two broaching tools are used, however, for simultaneously broaching two dividing walls, the upper broaching tool is preferably provided with a suitable guide to prevent the cutting bit of the tool from declining from the desired course of cut. This is particularly essential in deep cuts where the broaching tools are of considerable length and, due to the loose fit of the tool shank in the drill chuck, the free end of the broaching tool may drop considerably below the axis of the rock drill whereby the broaching tool is actuated.

It is therefor an object of the present invention to prevent declination of the broaching tool from the desired line of cut and at the same time to permit limited rotative movement of the guiding means in order that the broaching tool may so adjust its position as to enable the cutting bit to at all times follow the narrowest portion of the wall between the adjacent holes, particularly where one or both of a pair of drill holes are somewhat deflected from the desired course of cut, due to abnormalities in the rock formation.

Other objects will be in part obvious and in part pointed out hereinafter.

In the drawings illustrating the invention and a practical application thereof,

Figure 1 is a longitudinal side view of a guide constructed in accordance with the practice of the invention, Figure 2 is a transverse view taken through Figure 1 on the line 2—2, Figure 3 is an elevation of a rock face showing the drill holes and the spacing thereof preliminary to the broaching operation, Figure 4 is a view similar to Figure 3 showing the initial broaching cut connecting the four upper holes in pairs, Figure 5 is a view similar to Figure 4 showing the succeeding position of the broaching tools and the manner in which the uppermost broaching tool is guided, Figure 6 is an enlarged detail view in elevation of a rock face illustrating the manner in which the lowermost broaching tool is normally guided by the wall of the drill hole, and Figure 7 is a similar view illustrating the manner in which the uppermost broaching tool is held against declination from the desired line of cut.

Referring more particularly to the drawings, A designates a guide comprising a bar B carrying on one side thereof a lateral leg C. The bar B is preferably of somewhat smaller width than the diameter of the drill holes D in the rock E so that when the guide is inserted in the drill holes D which it engages with side edges B' at points remote from the broaching cut, a flat surface F which forms a bearing for a broaching tool G will lie slightly below the axis of the drill hole D.

Preferably holes H are formed near the ends of the leg C to enable the insertion of a hook or other implement for the purpose of extracting the guide A from the drill holes. The holes H are preferably of a suitable size to receive a bar or other suitable means which may lie across the rock face to prevent the guide A from being driven into the drill hole beyond the convenient reach of the operator by the broaching tool G.

After the horizontal drill holes D have been drilled along a vertical line, the ordinary drill steels may be replaced by the broaching tools G. Inasmuch that the spacing of the drills in which the broaching tools are inserted also limits the spacing of the broaching tools, only alternate walls J between the drill holes may be cut at the same time. This is illustrated in Figure 4 in which the uppermost broaching tool G spans the wall J between the two uppermost holes D and the lowermost broaching tool G spans the wall between the succeeding pair of drill holes.

When making the first or uppermost broaching cut in the rock, it will be unnecessary to employ guiding means for either of the broaching tools G since then both broaching tools are satisfactorily supported and guided by the wall of the lowermost hole D of each of the pair of holes which the tools G span. However, after the first cut at the uppermost end of the line of cuts has been made and the drilling mechanism has been lowered so that the uppermost broaching tool G spans the wall J between the first two pairs of holes D only the lowermost broaching tool G will be supported by the wall of the drill hole. The upper broaching tool G being of substantially the same width as the slot previously cut and, due to the loose fit of the tool shank in the drill chuck as previously mentioned, the bit end of said upper tool G will gradually decline as the tool advances into the rock and, since such declination may reach an extent where the cutting bit will no longer span the width of the wall J, the rock or wall J between the drill holes will be only partly removed. This, however, may be obviated by inserting the guide A in the lowermost of the drill holes D. In this way a substantial bearing surface will be provided for the upper broaching tool G and the guide A will maintain the broaching tool substantially in coaxial alignment with the rock drill whereby said tool is being actuated.

As will be observed, the leg C is of sufficiently less width than the cutting bit of the broaching tool and thus also than the width of the slot between the holes D, to enable the guide A to rotate in the drill hole within limits and thus adjust its position with respect to that of the broaching tool G for which it forms a bearing.

I claim:

A guide adapted to be inserted in a drill hole for guiding a broaching steel, comprising a bar having edges to engage the wall of a drill hole at points remote from the broaching cut for supporting the bar, a flat surface on the bar forming a bearing for the broaching tool, said bar being of less width than the diameter of the drill hole to enable the flat surface to lie below the axis of the drill hole, and a leg on the bar adapted to extend into a preceding broaching cut, said means being of sufficiently less width than the width of such broaching cut to enable the bar to be adjusted to the most suitable position by the broaching tool.

In testimony whereof I have signed this specification.

CHARLES C. HANSEN.